PAUL JENNET.
Glass-Cutter.

No. 126,302.  Patented April 30, 1872.

Witnesses:
A B Richmond
Roe Reisinger

Inventor:
Paul Jennet 126,302

UNITED STATES PATENT OFFICE.

PAUL JENNET, OF MEADVILLE, PENNSYLVANIA.

IMPROVEMENT IN GLASS-CUTTERS.

Specification forming part of Letters Patent No. 126,302, dated April 30, 1872.

Specification describing certain Improvements in Glass-Cutting Tools, invented by PAUL JENNET, of Meadville, in the county of Crawford and State of Pennsylvania.

My invention consists in combining a double-edged cutting-wheel of hardened steel with a stock having inclined or tapering faces, the small end of which is secured in a socket, so that when the tool is held with the tapering or inclined face against a rectangular rule or square only one of the cutting-edges of the wheel will be in contact with the glass to be cut, thereby providing a tool having two cutting-edges instead of one, each edge of which can be used in turn without affecting the other, and which will, therefore, last twice as long without renewal as the single-edged cutters heretofore in use.

Figure 2:
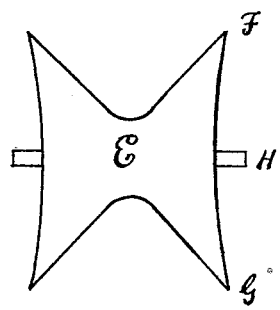
Figure 1:

In the accompanying drawing, Figure 1 is a view of my improved tool. Fig. 2 is an enlarged view of the cutting-wheel detached.

A represents the handle, B the socket. S is the stock, constructed as shown in the drawing, with inclined or tapering faces diverging outwardly from the socket B. A recess or slot, C, is formed in the outer or wide end of the stock in which is pivoted the cutting-wheel E. The cutter E is made of steel, hardened sufficiently to cut glass. It is formed like a pulley, with concave faces, so as to be easily ground or sharpened. H is the pin or axle, by which it is attached to the stock S so that it will revolve freely.

To use my cutter a rule with a square edge is placed on the glass to be cut, the inclined face of the stock being kept against the rule. The taper of the stock will thus bring one of the edges of the cutter to bear on the glass, while the other is free. The cutter is then pressed upon the glass and drawn across it in the usual way.

When one edge is dulled by use the tool is turned so as to bring the other edge to bear on the glass, while the dull edge is free. When both edges have become dull from use, the cutter can be removed and ground or sharpened, or another cutter can be substituted, as desired.

Claim.

The double-edged cutter E, in combination with the stock S having inclined faces, as set forth, for the purpose specified.

PAUL JENNET.

Witnesses:
A. B. RICHMOND,
ROE REISINGER.